United States Patent
Tucker et al.

(10) Patent No.: US 6,538,595 B1
(45) Date of Patent: Mar. 25, 2003

(54) SYSTEM AND METHOD FOR USING INFRARED REMOTE CONTROL PACKET DELIVERY IN A WIRELESS KEYBOARD HAVING A POINTING DEVICE

(75) Inventors: John R. Tucker, Canton, GA (US); David I. Chang, Norcross, GA (US); William L. Lott, Duluth, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/491,561

(22) Filed: Jan. 26, 2000

(51) Int. Cl.[7] ............................................... G08C 19/12
(52) U.S. Cl. ..................... 341/178; 341/29; 345/168; 710/6
(58) Field of Search ........................... 341/22, 26, 176, 341/29, 178; 345/168, 156, 169; 710/6, 63

(56) References Cited

U.S. PATENT DOCUMENTS

| | | | | |
|---|---|---|---|---|
| 5,793,359 A | * | 8/1998 | Ushikubo | 345/169 |
| 5,955,975 A | * | 9/1999 | Frederick et al. | 341/22 |
| 6,008,921 A | * | 12/1999 | Brusky et al. | 359/142 |
| 6,031,470 A | * | 2/2000 | Asari et al. | 341/126 |
| 6,078,789 A | * | 6/2000 | Bodenmann et al. | 370/470 |
| 6,131,130 A | * | 10/2000 | Van Ryzin | 340/825.52 |
| 6,151,645 A | * | 11/2000 | Young et al. | 710/315 |
| 6,304,250 B1 | * | 10/2001 | Yang et al. | 341/22 |
| 6,359,610 B1 | * | 3/2002 | Shah et al. | 345/156 |

* cited by examiner

Primary Examiner—Michael Horabik
Assistant Examiner—Albert K. Wong
(74) Attorney, Agent, or Firm—Kenneth M. Massaroni; Hubert J. Barnhardt, III; Shelley L. Couturier

(57) ABSTRACT

An infrared (IR) keyboard having a communication protocol and a method for operating same includes circuitry for converting a standard recognized keystroke into a corresponding IR data word for transmission to an IR receiver. The IR keyboard includes circuitry and logic which determines the type of key being actuated and assigns a communication protocol based upon the detected key. An IR code word corresponding to the detected key is associated with the key press and is transmitted from the IR keyboard to an IR receiver using a protocol corresponding to the type of key detected.

36 Claims, 12 Drawing Sheets

SYSTEM AND METHOD FOR USING INFRARED REMOTE CONTROL PACKET DELIVERY IN A WIRELESS KEYBOARD HAVING A POINTING DEVICE

TECHNICAL FIELD

The present invention relates generally to the transmission of wireless infrared (IR) signals, and, more particularly, to a system and method for using IR packet delivery in a wireless keyboard having a pointing device.

BACKGROUND OF THE INVENTION

The use of wireless IR communications has been known for quite some time. A typical application for such IR communications has been, and is currently, for remote control of electronic devices. For example, the remote control that is used with most television sets, video cassette recorders (VCR's), home audio systems, etc., makes use of IR technology to communicate commands from the remote control device to the electronic equipment. Such commands may be used to control whether the device is on or off, to control the volume, to control the channel to which the device is tuned, etc. Typically, the remote control includes circuitry that detects the actuation of one of the control keys, or buttons. Each control key on the remote control has a digital code associated therewith. When a particular key is pressed the logic within the remote control determines the code associated with the pressed key, modulates an IR radio frequency (RF) carrier with that code, and transmits the IR signal including the code associated with the pressed key to a receiver located at the electronic device.

In some applications the IR receiver may be located within the electronic device, and in other applications the IR receiver may reside in a separate control box. For example, the receiver may be located within a settop control box associated with a television set.

A new application for IR remote control functions is a wireless typewriter style keyboard. Such a wireless keyboard would be useful in applications in which it is desirable to use a television set for more than merely viewing television programming. For example, new broadband services make available to customers the ability to interact with a television set. Such services may include the use of a television and a special settop box that enables a user to connect to the Internet using the special settop box. In such an arrangement, the television is used as the monitor over which a user views Internet web sites. In such an application, it would be desirable to have a wireless typewriter style keyboard that the user can use to communicate with the special settop box in order to navigate or surf the Internet. Such a wireless typewriter style keyboard can make use of IR communication technology to communicate commands to the special settop box.

Most typewriter style keyboards adhere to what is known as the International Business Machines (IBM®) standard keyboard, hereinafter referred to as a standard, or conventional keyboard. The standard keyboard includes certain features that have become industry standard. For example, a standard keyboard defines certain keys as "typematic" keys. Typematic keys are keys that will repeat if continually held down. For example, were a user of a personal computer running a word processing program to hold down the "a" key on a standard keyboard, the letter "a" will be duplicated on the screen for as long as the "a" key is held down.

In a wireless IR keyboard as described above, and similar to the wireless IR remote control described above, each time a keyboard key is pressed a digital code corresponding to the pressed key is generated, modulated onto an RF IR carrier, and transmitted to the special settop box. The settop box receives the RF IR signal, decodes the signal and determines which key was pressed.

One of the difficulties in such a wireless IR keyboard is related to correctly interpreting the code corresponding to the pressed key. Of particular concern is determining whether a key is being held down or whether a different key is pressed. In order to compensate for this, most IR communication protocols include a minimum timing delay between transmissions of IR packets. For example, a minimum time delay can be inserted between code transmissions such that accurate determination may be made if a key is being held down. In such systems, the timing of the standard functions (such as the typematic keys described above) may not always coincide with the standard IR protocol timing requirements.

Therefore, it would be desirable to devise an IR communication protocol that can seamlessly integrate standard keyboard functionality into an existing IR communication protocol.

SUMMARY OF THE INVENTION

The invention provides a keyboard and method for transmitting IR signals corresponding to key presses and releases on an IR keyboard.

In architecture, the invention may be conceptualized as an IR keyboard having a communication protocol comprising circuitry configured to convert a standard recognized keystroke into a corresponding IR data word and circuitry configured to transmit the IR data word.

The present invention may also be conceptualized as a method for operating an infrared (IR) keyboard, the method comprising the steps of detecting, in a keyboard, a standard recognized keystroke, converting the standard recognized keystroke into a corresponding IR data word, and transmitting the IR data word.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

The keyboard IR logic of the invention can be implemented in hardware, software, firmware, or a combination thereof. In the preferred embodiment(s), the keyboard IR logic is implemented in software or firmware that is stored in a memory and that is executed by a suitable instruction execution system. If implemented in hardware, in an alternative embodiment, the keyboard IR logic can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a field programmable gate array (FPGA), etc.

Figure 1A:
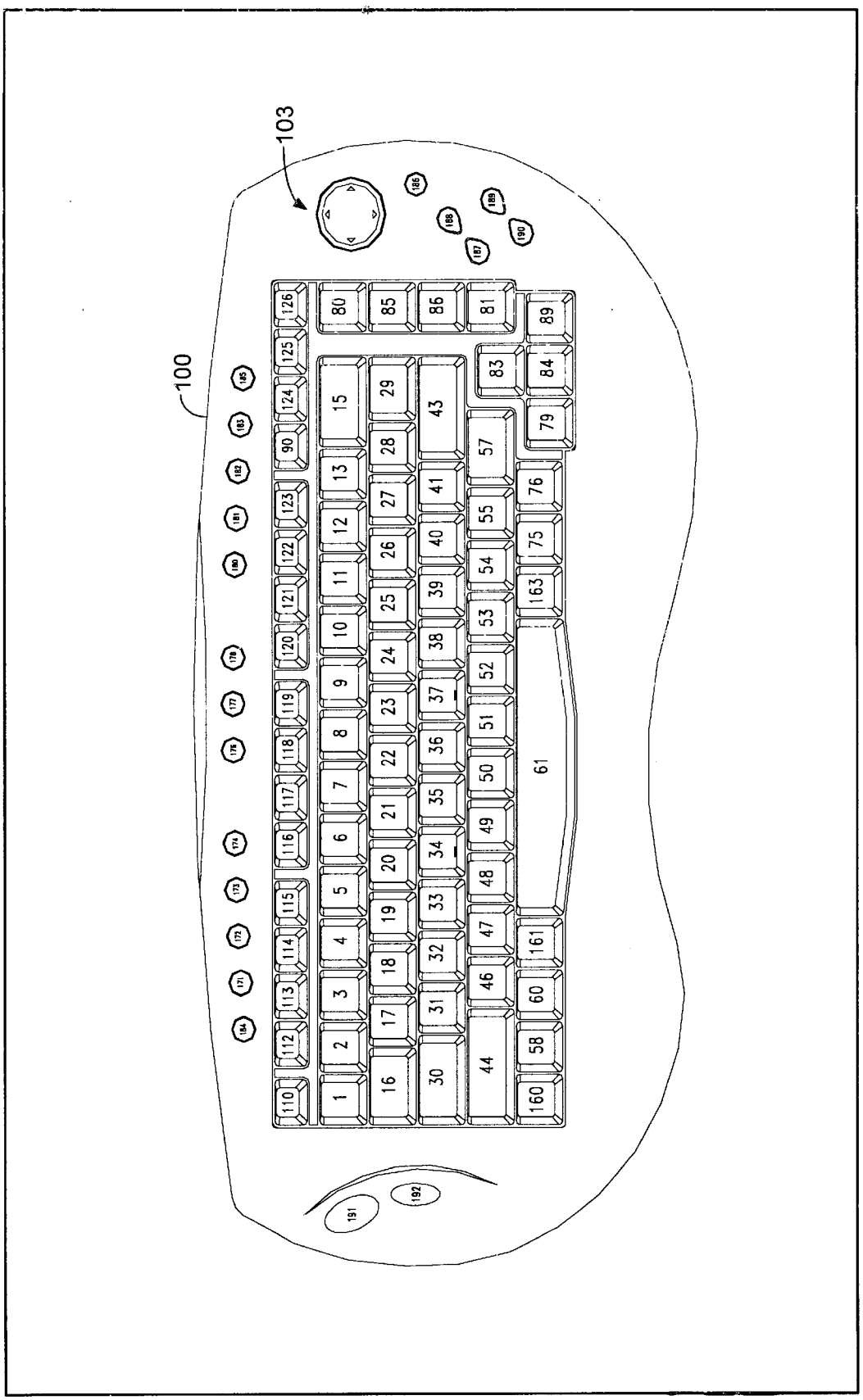
FIG. 1A is a graphical representation of an IR keyboard.

Turning now to the drawings, FIG. 1A is a graphical representation of an IR keyboard 100 in accordance with the invention. Keyboard 100 includes a number of alphanumeric keys and a pointer device 103. The key numbers correspond to the key mapping illustrated in Appendix A.

Figure 1B:
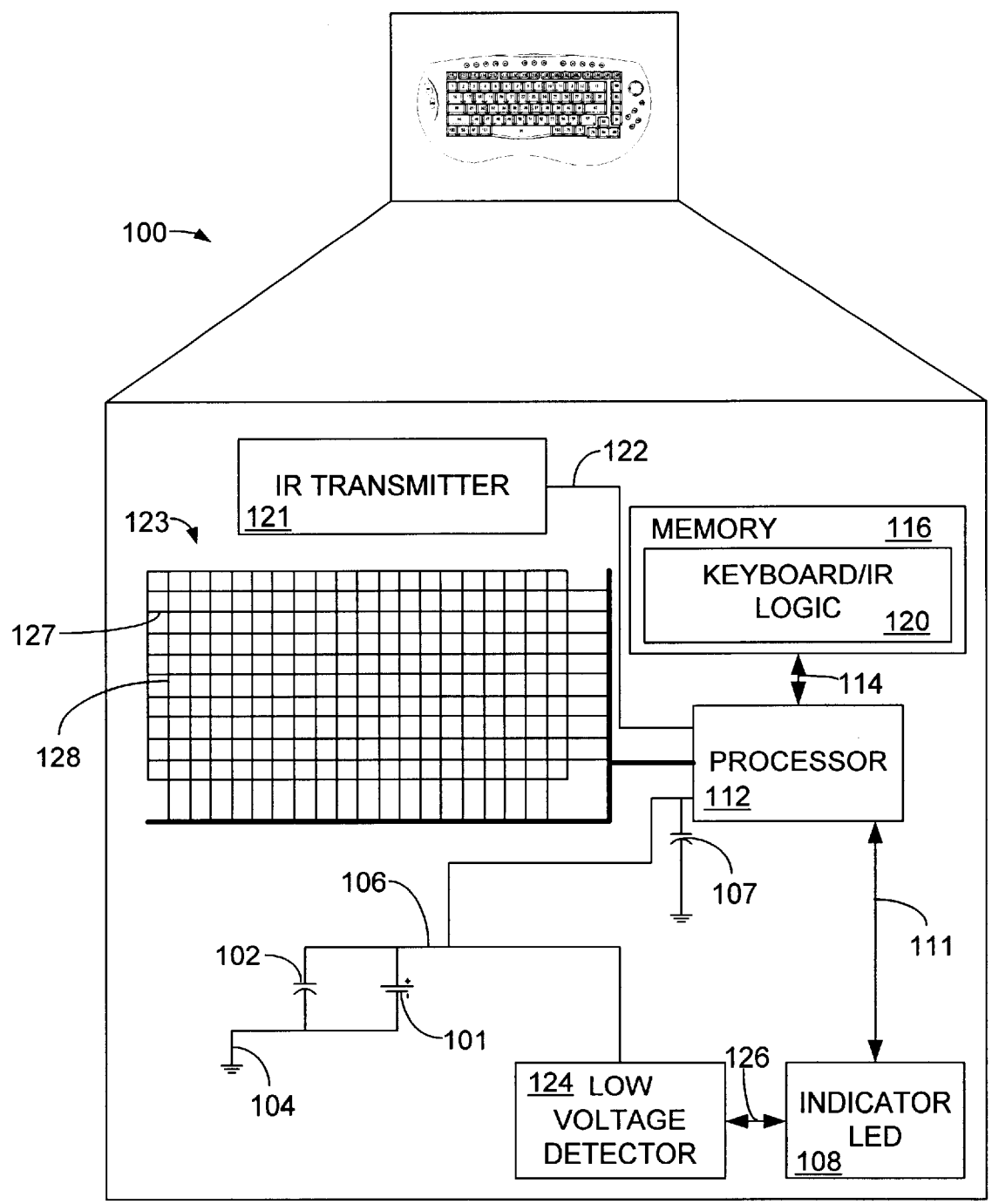
FIG. 1B is a block diagram illustrating the internal components of the IR keyboard of FIG. 1A in accordance with an embodiment of the invention.

FIG. 1B is a block diagram illustrating the internal components of the IR keyboard 100 of FIG. 1A in accordance with an embodiment of the invention. IR keyboard 100 includes keyboard matrix 123, which includes horizontal lines, an exemplary one of which is indicated by reference numeral 127, and vertical lines, an exemplary one of which is illustrated by reference numeral 128. Typically, buttons on IR keyboard 100 are located at the intersection of horizontal lines 128 and vertical lines 127. When actuated, i.e., pressed, the button associated with the intersection of horizontal lines 127 and vertical lines 128 within keypad matrix 123 causes an electrical connection to be made at the intersecting lines. In this manner, when a button is pressed, a circuit is completed at the particular intersection of vertical and horizontal lines corresponding to the pressed button and a signal is sent via communication bus 126 to processor 112. Processor 112 analyzes the received signal and, depending upon which horizontal line and which vertical line are indicated by the button press, determines which function or key has been pressed.

IR keyboard 100 also includes power source 101, which is typically a replaceable battery, and bypass capacitor 102. Power source 101 and bypass capacitor 102 are grounded at location 104 and communicate via connection 106 with processor 112 and low voltage detector 124. Processor 112 is also connected via connection 111 to an indicator light emitting diode (LED) 108. Indicator LED 108 indicates when an IR signal is being transmitted and also functions as a low battery indicator when low voltage detector 124 detects a low battery voltage and communicates a low voltage signal over connection 126 to indicator LED 108.

Processor 112 also includes capacitor 107. Capacitor 107 is typically maintained in a charged state so that television setup information stored in memory 116 will be retained during battery changes.

Processor 112 communicates via connection 114 with memory 116. Memory 116 is typically a random access memory (RAM) that contains the keyboard IR logic 120 of the invention. As will be described in further detail below, when processor 112 detects a key press from keypad matrix 123, processor 112 accesses memory 116 and keyboard IR logic 120 to determine the proper IR code corresponding to the detected key press. Once the processor 112 determines the correct IR code based on the detected key press, the processor 112 communicates with IR transmitter 121 via connection 122 to send an appropriate IR signal containing the appropriate key code word to an IR receiver as controlled by processes described below.

Figure 2:
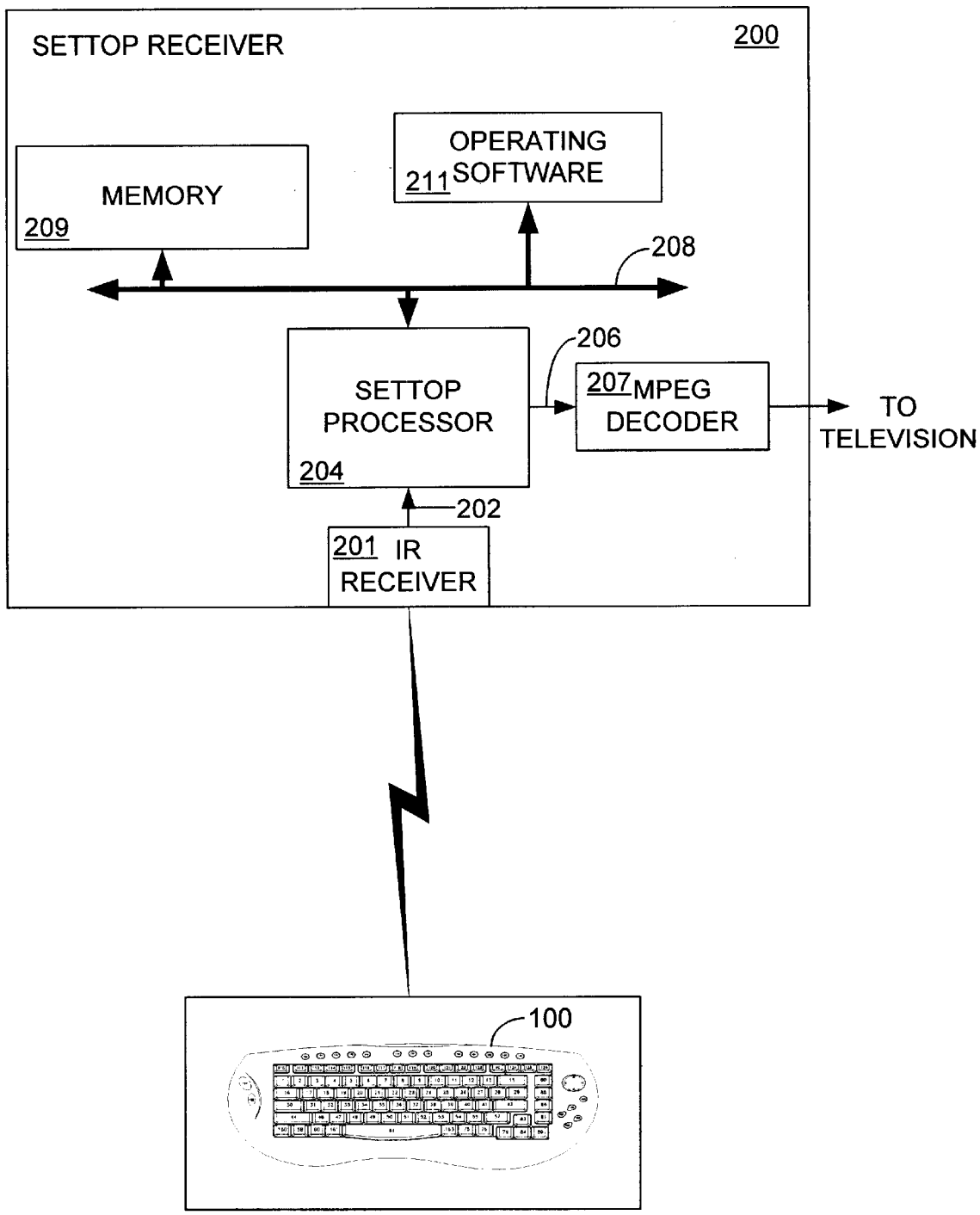
FIG. 2 is a schematic view illustrating the IR keyboard of FIG. 1A communicating with a settop receiver.

FIG. 2 is a schematic view illustrating the IR keyboard 100 communicating with settop receiver 200. As mentioned above, IR keyboard 100 transmits an IR signal containing an IR code word, which is received in the settop receiver 200. Although illustrated as being transmitted to a settop receiver 200, the IR signal transmitted by IR keyboard 100 can be received by any communication box such as the settop receiver 200, directly by a television (not shown), and by any of a number of new interactive television control boxes or devices.

IR receiver 201 demodulates the received IR signal (i.e., removes the modulated carrier), and transfers, via connection 202, the serial data stream to the settop processor 204. Settop processor 204 decodes the serial data stream data and stores the value in memory 209 via bus 208. After the value has been stored, settop processor 204 generates an interrupt, which informs operating software 211 that an IR event has been received. Operating software 211 then retrieves the stored register value from memory 209 via bus 208 and performs the required action corresponding to the received IR code. A five bit custom code (to be described below with respect to FIG. 4) is transmitted from the IR keyboard 100 to the settop receiver 200 in the IR signal and informs the settop receiver 200 of the identity of the IR keyboard. Settop receiver 200 also includes MPEG decoder 207, which receives a program stream from settop processor 204 via connection 206. MPEG decoder supplies a decoded programming signal to a television (not shown) as known in the art.

Figure 3:
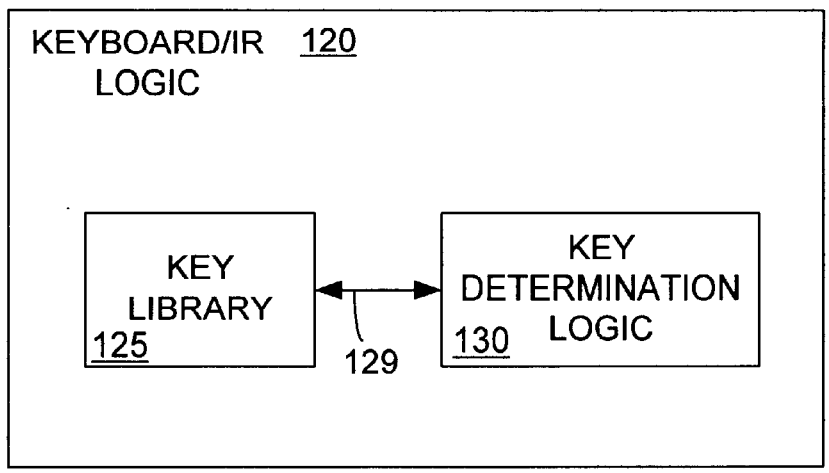
FIG. 3 is a schematic view illustrating the keyboard IR logic of an embodiment of the invention.

FIG. 3 is a schematic view illustrating the keyboard IR logic 120 of an embodiment of the invention. Keyboard IR logic 120 includes key library 125 in communication via connection 129 with key determination logic 130. Referring back to FIG. 1B, when processor 112 detects a key press from keyboard matrix 123, the processor 112 communicates with keyboard IR logic 120 to determine which key type and which key was pressed. The key determination logic 130 in cooperation with the key library 125 analyzes the key press information received from the processor 112 and determines which key code to pass to the processor 112 for transmission. The key library 125 is a listing of key functions and corresponding code words, and an example of such information is illustrated in Appendix A. Appendix A is a listing of the IR transmission packets corresponding to the keyboard keys of the invention.

Figure 4:
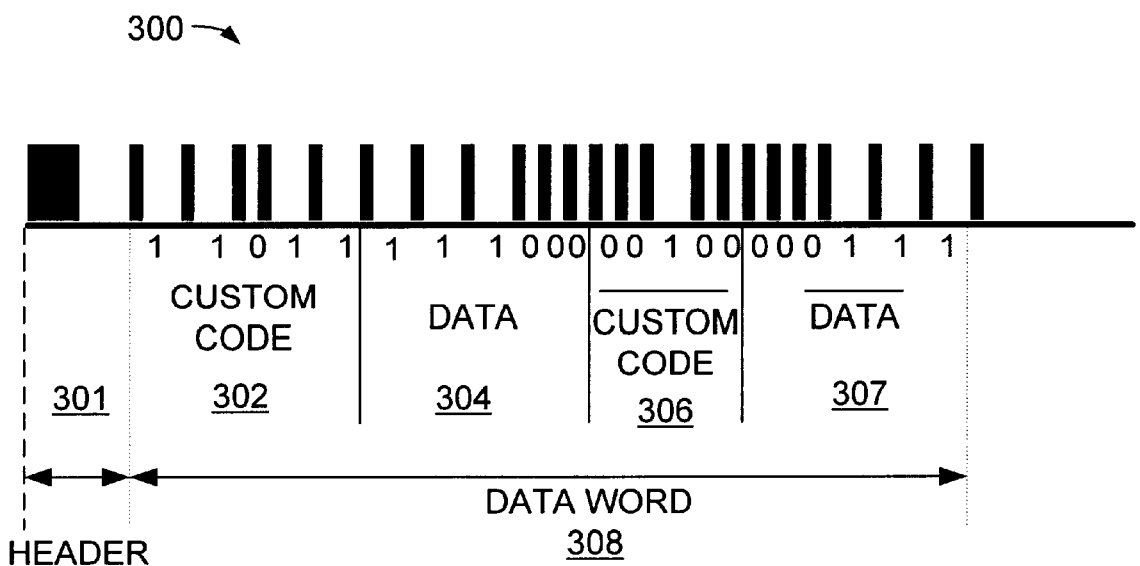
FIG. 4 is a schematic view illustrating an example of a data frame that is transmitted by the IR keyboard of FIG. 1A.

FIG. 4 is a schematic view illustrating an example data frame 300 that is transmitted by the IR keyboard 100 of FIG. 1A. Data frame 300 includes header 301 and data word 308. Header 301 consists of 3.38 milliseconds (ms), which is equivalent to 192 periods, of IR modulation, followed by 3.38 ms of no modulation. The primary purpose of the header pulse is to set up the IR receiver's (FIG. 2) automatic gain control. Data word 308 includes custom code 302 and data code 304. The values of the custom code 302 and data code 304 are determined based upon the detected key press and are illustrated in Appendix A. Each key includes both a custom code and a data code. The five bit custom code 302 and the six bit data code 304 are used to identify the key selected from the keyboard. Data word 308 also includes the transmission of a complemented custom code 306 and a complemented data code 307. After the custom code 302 and data code 304 are sent, the keyboard transmits the complemented, or inverse, custom code 306 and the complemented, or inverse, data code 307. A data frame is considered valid if the exclusive or of the non-inverted bits and inverted bits are all ones. Any command that passes the exclusive or test is considered valid and is sent to the processor 112 (FIG. 1B). The processor 112 interacts with the key library 125 and the key determination logic 130 (FIG. 2) to determine the proper code to send. The data frame is then transmitted by the IR keyboard to the IR receiver in packets.

In accordance with an aspect of the invention, there are four types of IR protocols that are used in the IR keyboard 100. All protocols use the five bit custom code 302 and six bit data code 304 included in the data frame 300 described in FIG. 4.

Figure 5:
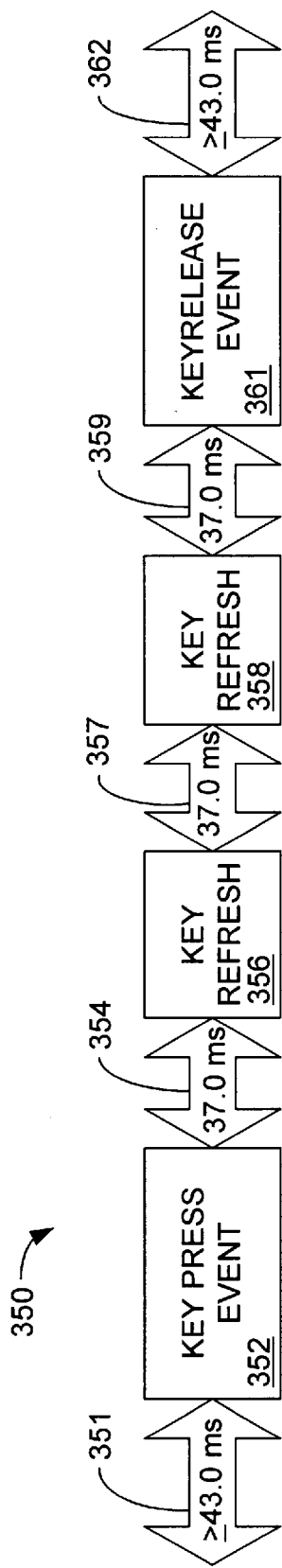
FIG. 5 is a schematic view illustrating an example IR protocol for Table One typematic keys.

FIG. 5 is a schematic view 350 illustrating an example IR protocol for Table One typematic keys and Direct Access keys (refer to Appendix A). After a waiting period 351 of at least 43 ms, key press event 352 takes place. In this embodiment, but not intended to be limited thereto, key press event 352 corresponds to a custom code and data code taken from the appropriate table in Appendix A. These codes have their associated five bit custom code and six bit data code, respectively. In this manner, key press event 352 is communicated by the IR keyboard to a receiver by sending the IR code corresponding to the appropriate custom code and data code. After key press event 352, and if the key is held down, after a period 354 of at least 37 ms, a refresh key down packet corresponding to the same IR code that was sent in block 352 is sent again as indicated in block 356. As long as the key is held down a continual stream of data frames corresponding to the same key press event sent in block 352 is sent, preferably spaced at least 37 ms apart as illustrated by periods 357 and 359, between which block 358 is sent, until a key release event 361 is detected by processor 112. Once the key is released, release event 361, which in the case of Table One and Direct Access keys is merely the last of the same IR code of the transmission, is sent. After the key release event 361 a waiting period 362 of at least 43 ms is again instituted before the next IR code is sent.

In the case of Direct Access keys, the remote control function key codes utilize the same IR and data modulation as well as packet format and timing as illustrated above with respect to FIG. 5. The following characteristics are unique to the remote control key functions. The RC (remote control) keys only have key-down code. While the same RC key is pressed, the corresponding key-down code is repeated with only approximately 37.98 msec between each packet. The continuous press of a key sends the same code for up to 2 minutes, then the keyboard ignores the press of that key. The keyboard returns to operation again when that key is lifted and pressed again, when any other key is pressed, or when pointer movement is detected. If the same RC key is pressed after a momentary lift of the key, or if any other key is pressed, the keyboard inserts at least a 43 msec break before any other packet is sent.

With respect to IR packet priority, the following is a list of IR packets listed in order of highest priority. IR packets with priority will interrupt keys with less priority, including key down events, after the transmitting IR packet is complete and a 43 ms break is inserted.
1. Mouse buttons.
2. Key down, refresh, and key up IR packets of the keyboard keys.
3. Pointer vector.
4. Remote control IR key packets.

It should be noted that IR words are not truncated. That is, if a key is released during transmission, the entire data packet will be transmitted.

Figure 6:
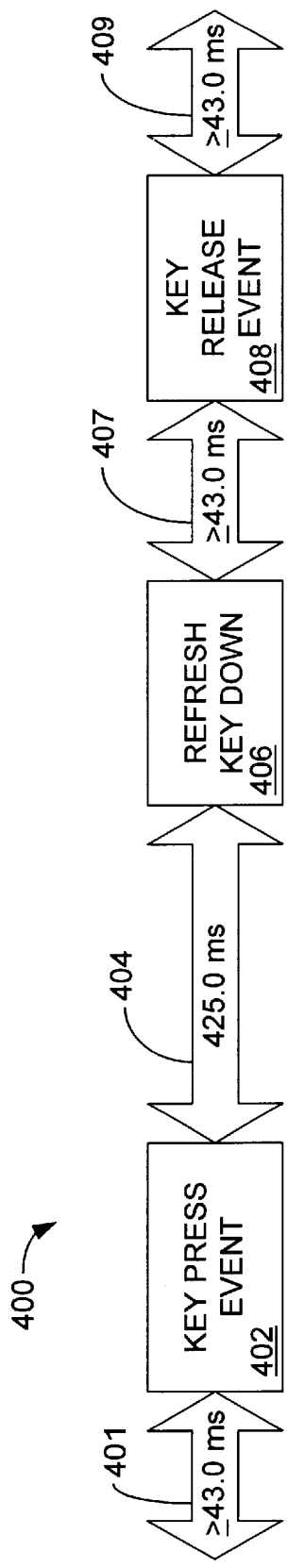
FIG. 6 is a schematic view illustrating an example IR protocol for Table Two typematic keys.

FIG. 6 is a schematic view 400 illustrating an example IR protocol for Table Two typematic keys (refer to Appendix A). With regard to Table Two typematic keys, data frames corresponding to the key presses are sent one at a time, with no pulse (silence) intervals between each data frame greater than or equal to 43 ms. If a Table Two typematic key is held down, the keyboard will transmit a key down refresh data frame every 425 ms. The key down refresh data frame is the same as the key down data frame in Table Two for that key press. This is used to confirm to the settop receiver that the key is still being pressed down and instructs the monitor to continue with the typematic repeat on the screen. As illustrated in FIG. 6, after a waiting period 401 of at least 43 ms, key press event 402 occurs. Assuming that the key corresponding to key press event 402 is held down, then after a 425 ms waiting period 404, a key down refresh data frame 406 is sent. Assuming that the key corresponding to key press event 402 has been released after the key down refresh data frame 406 has been sent, then after a waiting period 407 of at least 43 ms a key release event 408 will be sent. After key release event 408 is transmitted, and after a waiting period 409 of at least 43 ms the system is ready for the next key event.

Figure 7:
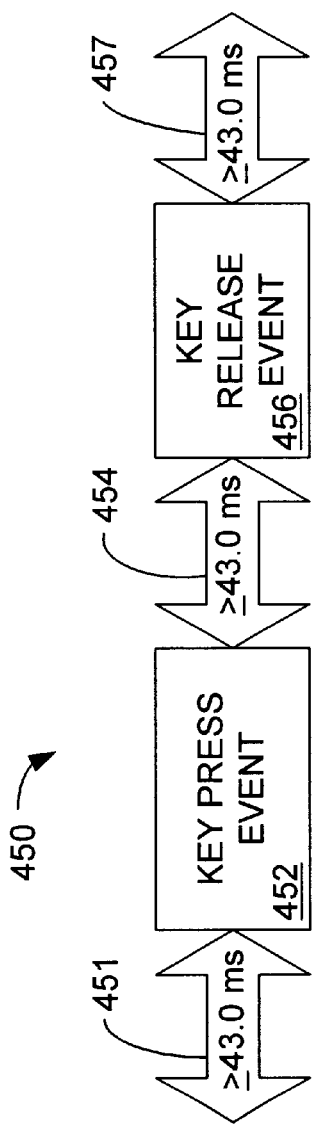
FIG. 7 is a schematic view illustrating an example IR protocol for Table Two make/break keys.

FIG. 7 is a schematic view 450 illustrating an example IR protocol for Table Two make/break keys (refer to Appendix A). The data frames corresponding to make/break keys are sent one at a time, with intervals greater than or equal to 43 ms between each data frame. No key down refresh data frames are sent for this type of key. As illustrated in FIG. 7, after a waiting period 451 of at least 43 ms a key press event 452 is transmitted. Assuming that the key corresponding to key press event 452 is released, then after a waiting period 454 of at least 43 ms, a key release event 456 is transmitted. After the transmission of key release event 456 then another waiting period 457 of at least 43 ms is instituted.

Figure 8:
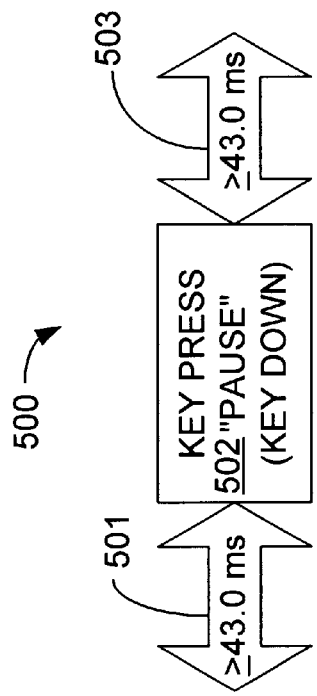
FIG. 8 is a schematic view illustrating an example IR protocol for Table Two make only keys.

FIG. 8 is a schematic view 500 illustrating an example IR protocol for Table Two make only keys (refer to Appendix A). Pressing a make only key sends only the key down IR code, sends no key release event when the key is released, and sends no refresh key down event if the key is held down. As shown in FIG. 8, after a waiting period 501 of at least 43 ms, the key press event 502 is sent. Because no key release event is sent, a timing break 503 between this data frame and the next is at least 43 ms.

The following tables illustrate the valid key combinations for the invention.
Valid 2-Key Combinations
The following keys combined with the "Valid final Keys" table (Table B below) defines the valid 2-key combinations.

When any one of the keys below is pressed, followed by a 2$^{nd}$ key from the "Valid Final Keys" table (Table B), the keyboard indicates that those 2 keys are pressed.

LCTRL
LSHIFT
RSHIFT
LALT

The RCTRL and RALT may alternatively be supported in other versions.

Valid 3-Key Combinations

The following Table A combined with the "Valid Final Keys" table (Table B), defines the valid 3-key combinations. For each row in Table A, an "X" indicates that key is selected. When the two keys in a row are pressed followed by a 3$^{rd}$ key from the "Valid Final Keys" table (Table B), the keyboard indicates that those 3 keys are pressed. Alternatively, 3-key combinations not listed may be configured to operate.

TABLE A

| LCTRL | RCTRL | LSHIFT | RSHIFT | LALT | RALT |
|-------|-------|--------|--------|------|------|
| x     |       | x      |        |      |      |
| x     |       |        | x      |      |      |
|       | x     | x      |        |      |      |
|       | x     |        | x      |      |      |
| x     |       |        |        | x    |      |
| x     |       |        |        |      | x    |
|       | x     |        |        | x    |      |
|       | x     |        |        |      | x    |
|       |       | x      |        | x    |      |
|       |       | x      |        |      | x    |
|       |       |        | x      | x    |      |
|       |       |        | x      |      | x    |

Valid Final Keys

The following Table B lists the final keys that will operate for the valid two and three mentioned above. Any key from the list above, or any two keys indicated in a row from the Table A combined with any key from the Table B are valid key combinations. Invalid key combinations may not generate any IR key code.

TABLE B

| Esc | 1         | Tab | A | C      | Left Arrow   |
|-----|-----------|-----|---|--------|--------------|
| F1  | 2         | Q   | S | V      | Right Arrow  |
| F2  | 3         | W   | D | B      | Up Arrow     |
| F3  | 4         | E   | F | N      | Down Arrow   |
| F4  | 5         | R   | G | M      | APP1         |
| F5  | 6         | T   | H | ,      | APP2         |
| F6  | 7         | Y   | J | .      | Enter        |
| F7  | 8         | U   | K | /      | Print Screen |
| F8  | 9         | I   | L | Insert | Scroll Lock  |
| F9  | 0         | O   | ; | Delete | Pause        |
| F10 | -         | P   | ' | Home   |              |
| F11 | =         | [   | Z | End    |              |
| F12 | Backspace | ]   | X | Page Up |             |
|     |           |     |   | Page Down |           |

FIGS. 9 through 12 are flowcharts collectively illustrating the operation of one embodiment of the keyboard IR logic 120. The flowcharts of FIGS. 9 through 12 show the architecture, functionality, and operation of a possible implementation of the keyboard IR logic 120 of FIGS. 1B and 3. In this regard, each block represents a module, segment, or portion of code, which comprises one or more executable instructions for implementing the specified logical function(s). It should also be noted that in some alternative implementations, the functions noted in the blocks may occur out of the order noted in FIGS. 9 through 12. For example, two blocks shown in succession in FIGS. 9 through 12 may in fact be executed substantially concurrently or the blocks may sometimes be executed in the reverse order, depending upon the functionality involved, as will be further clarified hereinbelow.

Figure 9:
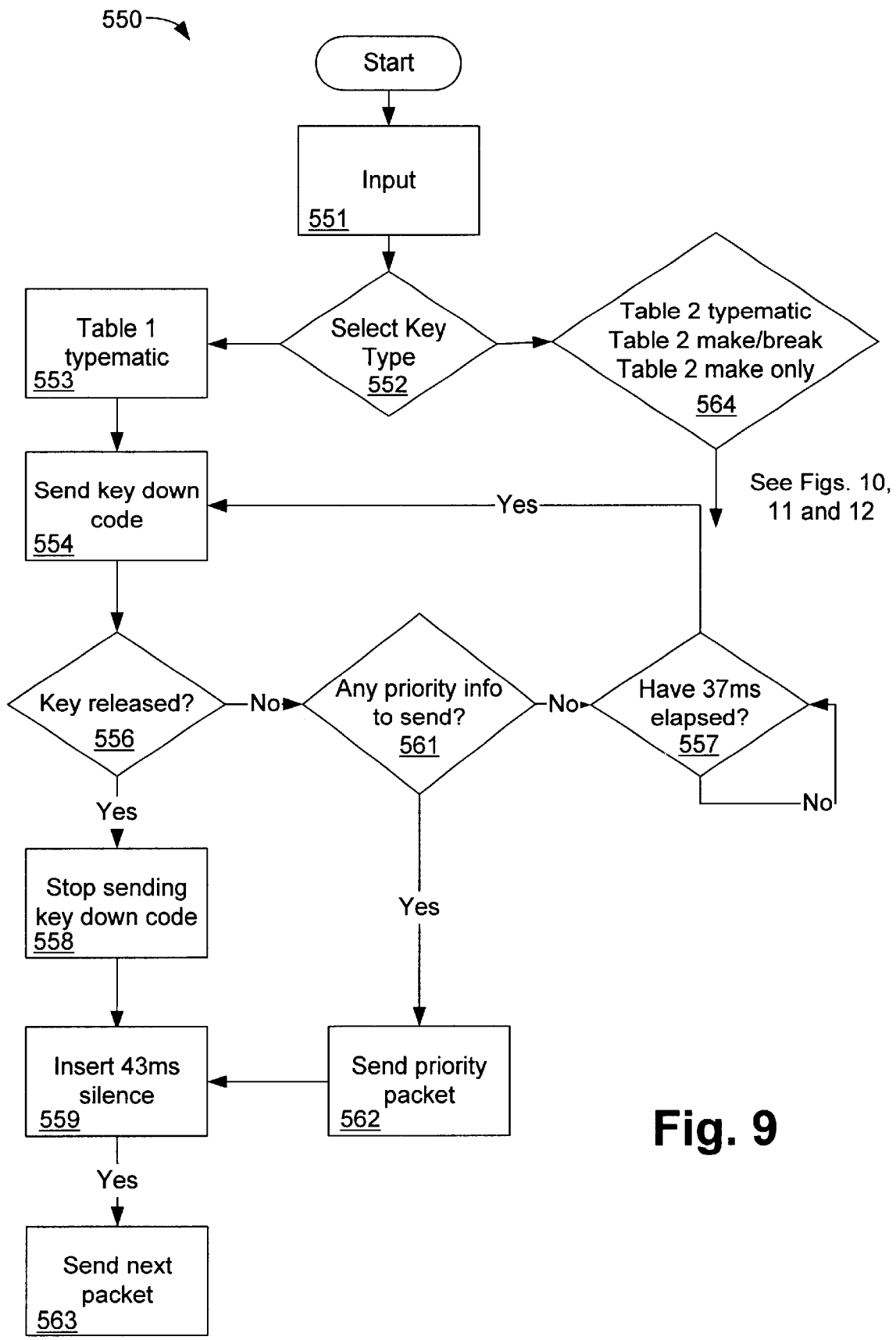
FIG. 9 is a flowchart illustrating the operation of an embodiment of the invention with respect to Table One typematic keys.

Referring now to FIG. 9, shown is a flowchart 550 illustrating the operation of an embodiment of the invention with respect primarily to Table One typematic keys. In block 551 a key press is detected as an input signal to processor 112 (FIG. 1B). In block 552 the type of key press is determined. If a Table One typematic key press is detected, then the process proceeds to block 553. If a Table Two typematic, a Table Two make break, or a Table Two make only key press is detected, then the process proceeds to block 564 and to FIGS. 10, 11 and 12, depending upon what type of key press is detected.

Referring back to block 553, if a Table One typematic key press is detected, then in block 554 the appropriate key down code corresponding to the detected Table One typematic key is transmitted by IR keyboard 100. In block 556 it is determined whether the key press detected in block 553 has been released. If the key has not been released, then in block 561 it is determined whether there is any higher priority information to send. In other words, it is determined whether any of the priority keys defined above have been pressed before the Table One typematic key has been released. If there is no higher priority information to send, then in block 557 it is determined whether at least 37 ms have elapsed. If at least 37 ms have not elapsed then the process continues to wait until 37 ms have elapsed. Once 37 ms have elapsed then, as long as the key is still pressed, the key down code is sent again in block 554.

If it was determined in block 561 that there is higher priority information to send (i.e., a priority key has been pressed), then in block 562 the priority packet is sent. After the priority packet is sent a 43 ms silent period is sent in block 559. As mentioned above, priority information can be the detection of the pressing of mouse buttons, key down, refresh, key up, the pointer vector, or the remote control IR key code words.

If it is determined in block 556 that the key detected in block 551 has been released, then in block 558 the transmission of the key down code is ceased.

In block 559 a silent period of 43 ms is inserted and in block 563 the next packet is ready for transmission.

Figure 10:
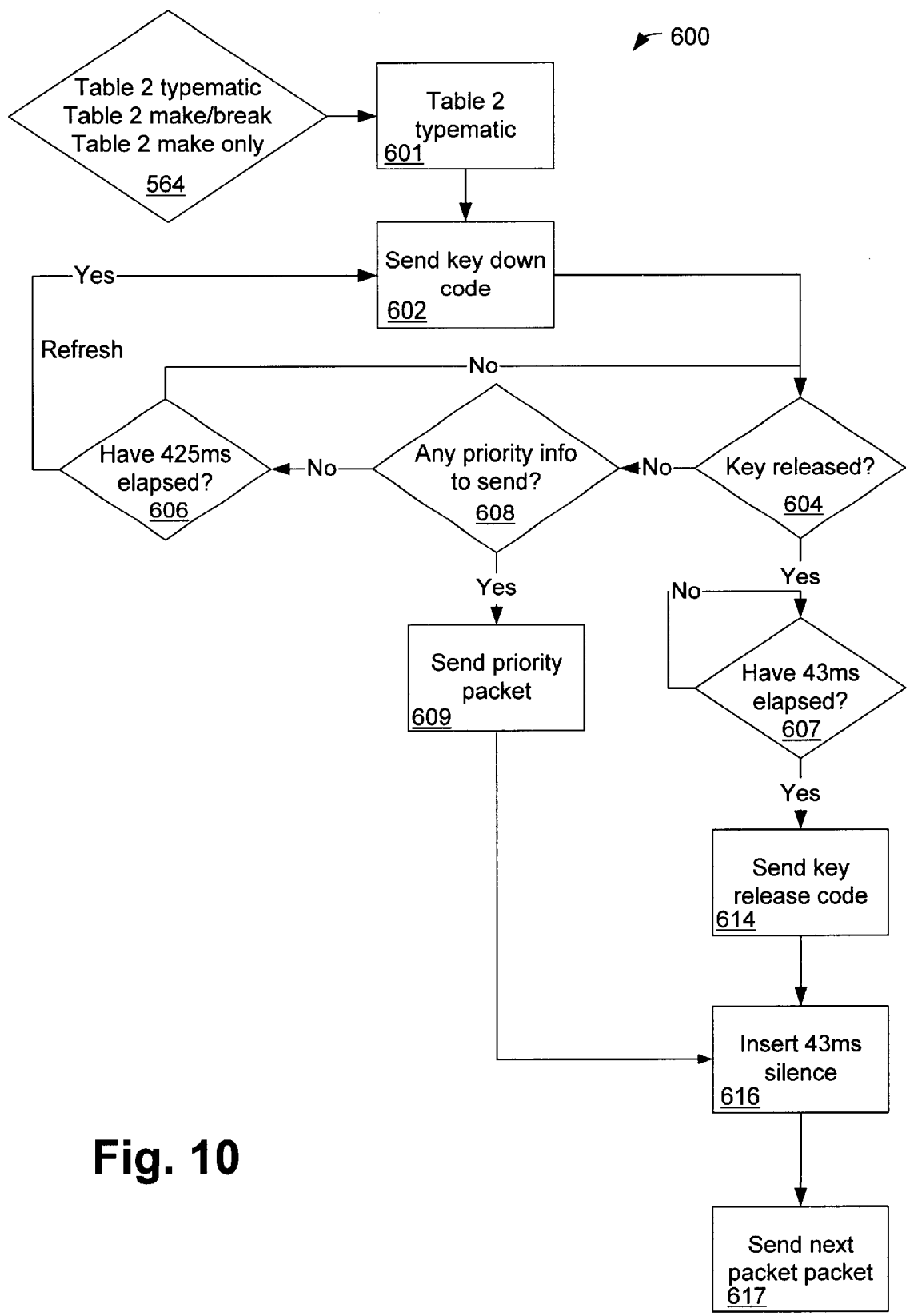
FIG. 10 is a flowchart illustrating the operation of an embodiment of the invention with respect to Table Two typematic keys.

FIG. 10 is a flowchart 600 illustrating the operation of an embodiment of the invention with respect to Table Two typematic keys. If a Table Two typematic key was detected in block 552 of FIG. 9, then in block 602 of FIG. 10, the appropriate code corresponding to the detected key press event corresponding to the detected type two typematic key is sent. In block 604 it is determined whether the detected Table Two typematic key has been released. If the key has not been released, then in block 606 it is determined whether there is any higher priority information to send. If there is no higher priority information to send, then in block 608 it is determined whether 425 ms have elapsed. If 425 ms have not elapsed, then the process returns to block 604 for determination of whether the detected key has been released. Upon expiration of 425 ms and if the key is still pressed, then in block 602 the key down code is sent again as a refresh key. If it was detected in block 606 that there is priority information to send, then in block 609 the priority packet is sent. After the priority information is sent 43 ms if silence is inserted at block 616. If in block 604 it is determined that the Table Two typematic key detected in block 552 is released, then in block 607 it is determined whether 43 ms have elapsed. If 43 ms have not elapsed, then the process continues to wait. Once 43 ms have elapsed the key release code is sent in block 614. After the key release code is sent in block 614, 43 ms of silence is inserted in block 616 and the next packet is sent in block 617.

Figure 11:
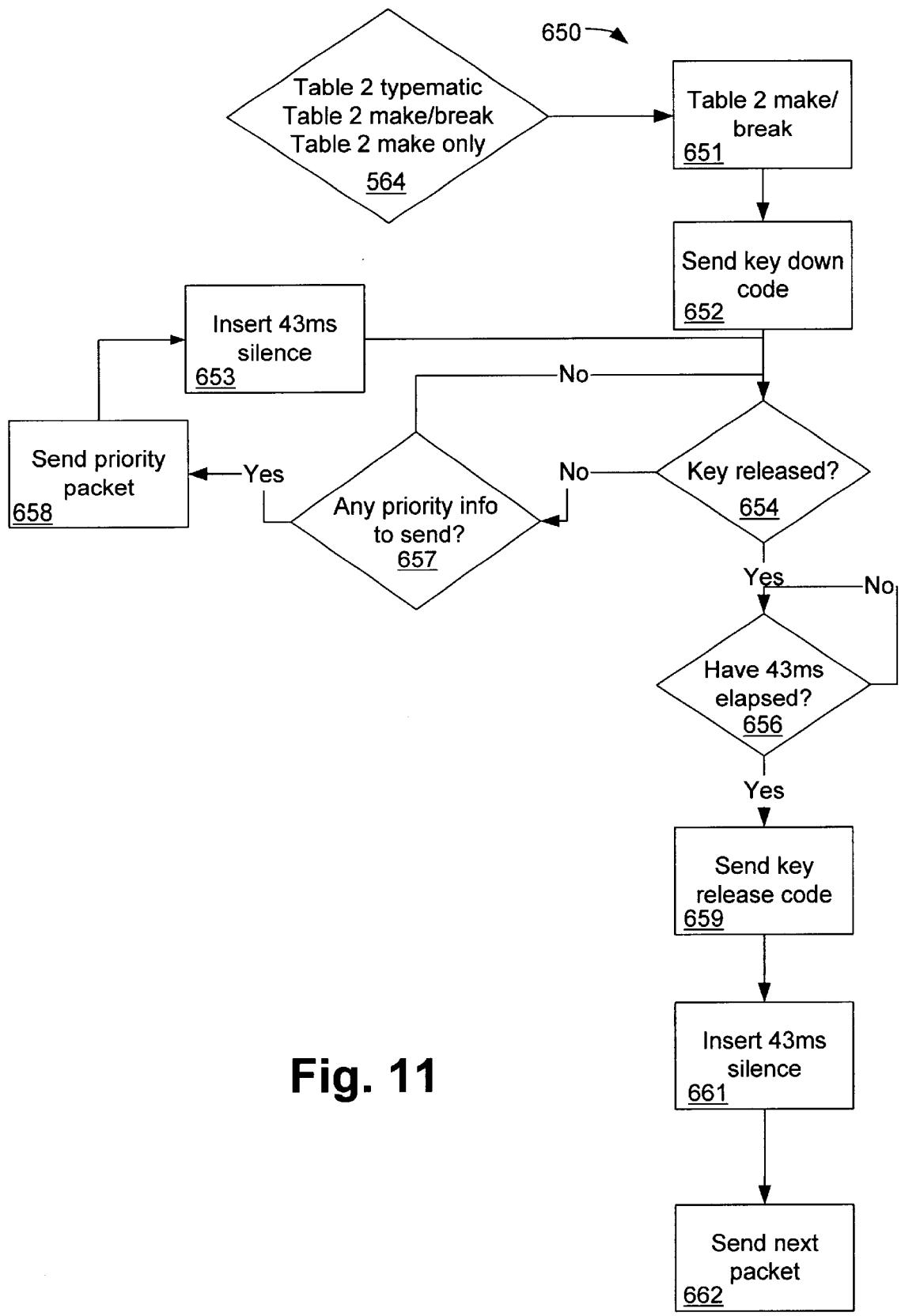
FIG. 11 is a flowchart illustrating the operation of an embodiment of the invention with respect to Table Two make/break keys.

FIG. 11 is a flowchart 650 illustrating the operation of an embodiment of the invention if a Table Two make/break key was detected in block 552 of FIG. 9. If a Table Two make/break key was detected, then in block 652 the appropriate IR code corresponding to the detected Table Two make/break key is sent. In block 654 it is determined whether the Table Two make/break key detected in block 552 of FIG. 9 has been released. If the key has not been released then, in block 657 it is determined whether there is any higher priority information to send. If there is no higher priority information to send the process returns to block 654 and continues to wait.

If it is determined in block 657 that there is priority information to send, then in block 658 the priority packet is sent. After the priority packet is sent, 43 ms if silence is inserted at block 653 and the process returns to block 654. If, in block 654 it is determined that the key has been released, then in block 656 it is determined whether 43 ms have elapsed. If 43 ms have not elapsed, then the process continues to wait. Once 43 ms have elapsed, the key release code is sent in block 659.

After the key release code is sent in block 659 43 ms of silence are inserted in block 661 and the next packet is sent in block 662.

Figure 12:
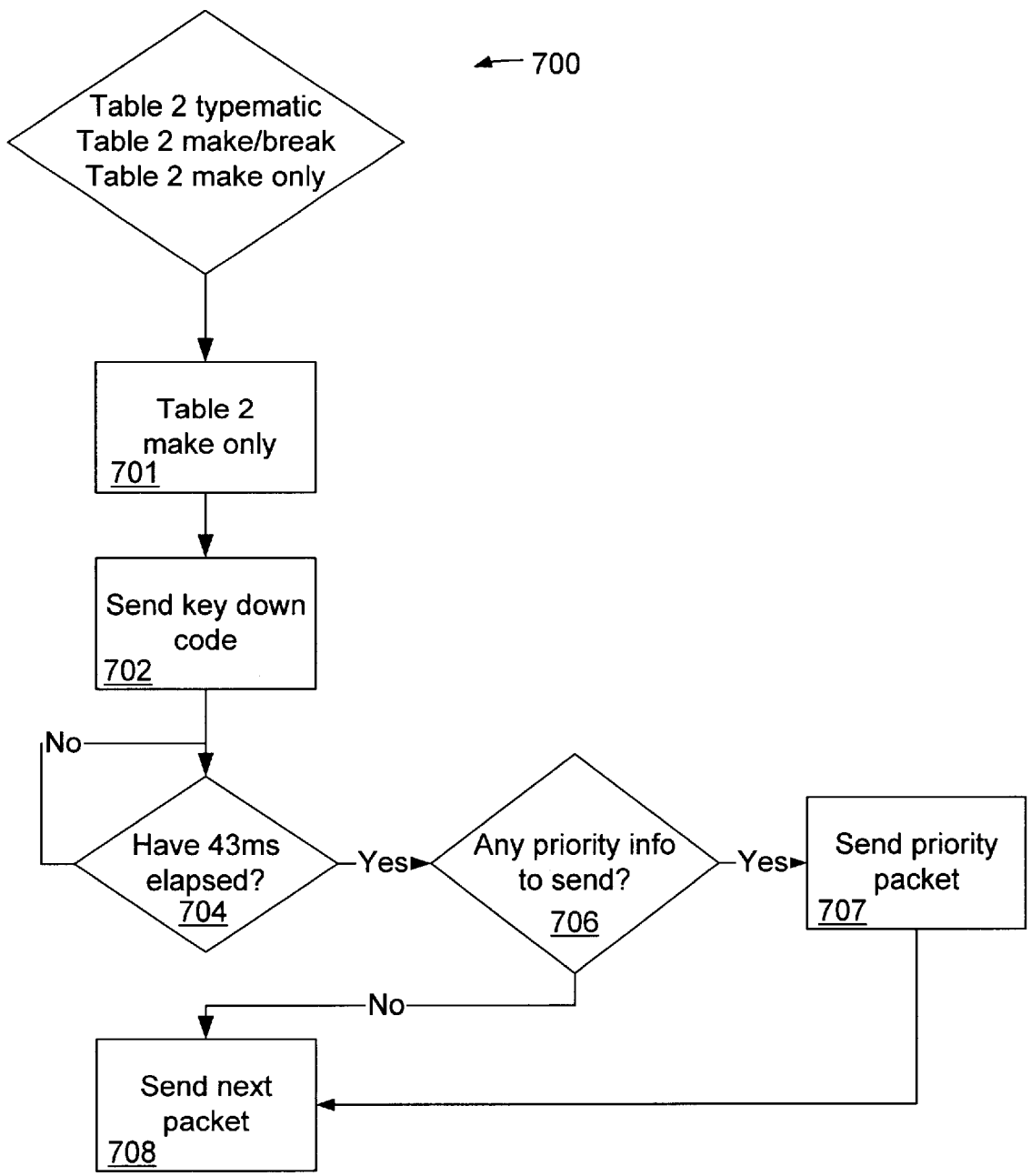
FIG. 12 is a flowchart illustrating the operation of an embodiment of the invention with respect to Table Two make only keys.

FIG. 12 is a flowchart 700 illustrating the operation of an embodiment of the invention if a Table Two make only key is detected in block 552 of FIG. 9. If a Table Two make only key was detected in block 552 of FIG. 9, then in block 702 the appropriate key down code is sent. In block 704 it is determined whether 43 ms have elapsed. If 43 ms have not elapsed then the process continues to wait. If it is determined in block 704 that 43 ms have elapsed, then it is determined in block 706 whether there is any higher priority information to send. If there is no higher priority information to send then in block 708 the next packet is sent. If it is determined in block 706 that there is higher priority information to send, then in block 707 the higher priority packet is sent. After the higher priority packet is sent in block 707, the next packet is sent in block 708.

IR keyboard 100 also supports a 16 direction, four speed pointer device 103. For the pointer device 103, a continual stream of IR data frames, such as that described with respect to FIG. 4, are sent as long as the user presses on the pointer in the same direction and speed. A no pulse (silence) interval of at least 43 ms will be inserted when either the speed or direction parameters change.

Figure 13:
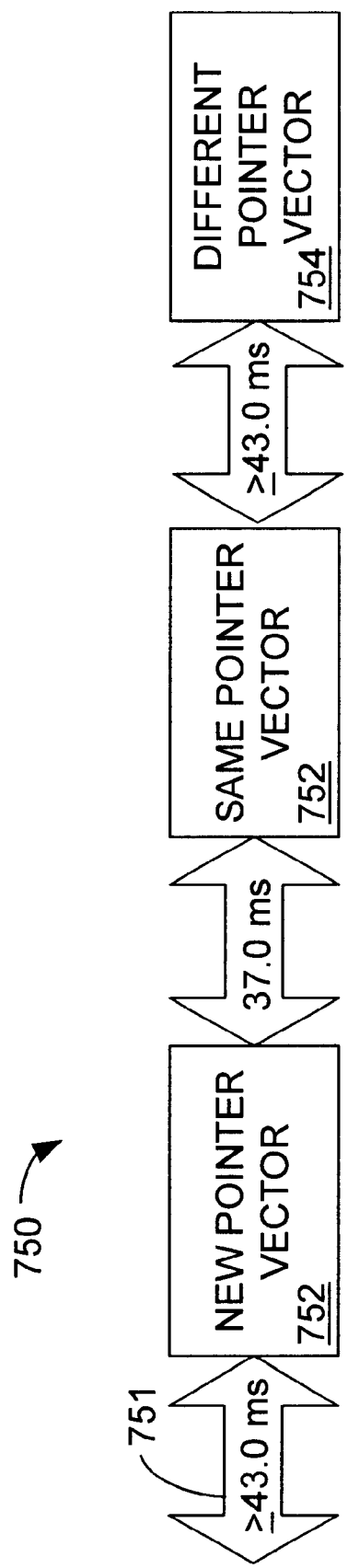
FIG. 13 is a schematic view illustrating an example IR protocol for the pointer device.

FIG. 13 is a schematic view 750 illustrating the IR protocol for the pointer device 103 associated with IR keyboard 100. After a delay 751 of at least 43 ms, a new pointer vector 752 is sent. If neither the speed nor direction changes within 37 ms, it is determined that the same pointer vector 752 should be sent again. If a new pointer vector is to be sent, a delay of at least 43 ms occurs, and a different pointer vector 754 is sent. The protocol illustrated in FIG. 13 uses a five bit custom code and six bit custom code IR data frame similar to that shown in FIG. 4 and FIG. 5. So long as a key is pressed or a pointer vector remains constant, a continuous stream of IR data frames spaced at least 37 ms apart are sent. The protocol indicated in FIG. 5 inserts a break (no pulse time, or silence, greater than or equal to 43 ms ) when a key is released, a new key is pressed, or a change in pointer direction or speed is detected with equal or greater priority.

The custom code for the pointer vector data frame is custom code 16 (HEX), which corresponds to a custom code 10110 (binary). With respect to the data code for the pointer vector, the first two bits of the data code define the speed. Table C below illustrates the first two bits of the speed data code.

TABLE C

| Speed | Hex | Bit 1 | Bit 0 |
|-------|------|-------|-------|
| 0 | 0x00 | 0 | 0 |
| 1 | 0x01 | 0 | 1 |
| 2 | 0x02 | 1 | 0 |
| 3 | 0x03 | 1 | 1 |

Regarding pointer direction, the last four bits of the data code define the direction.

Figure 14:
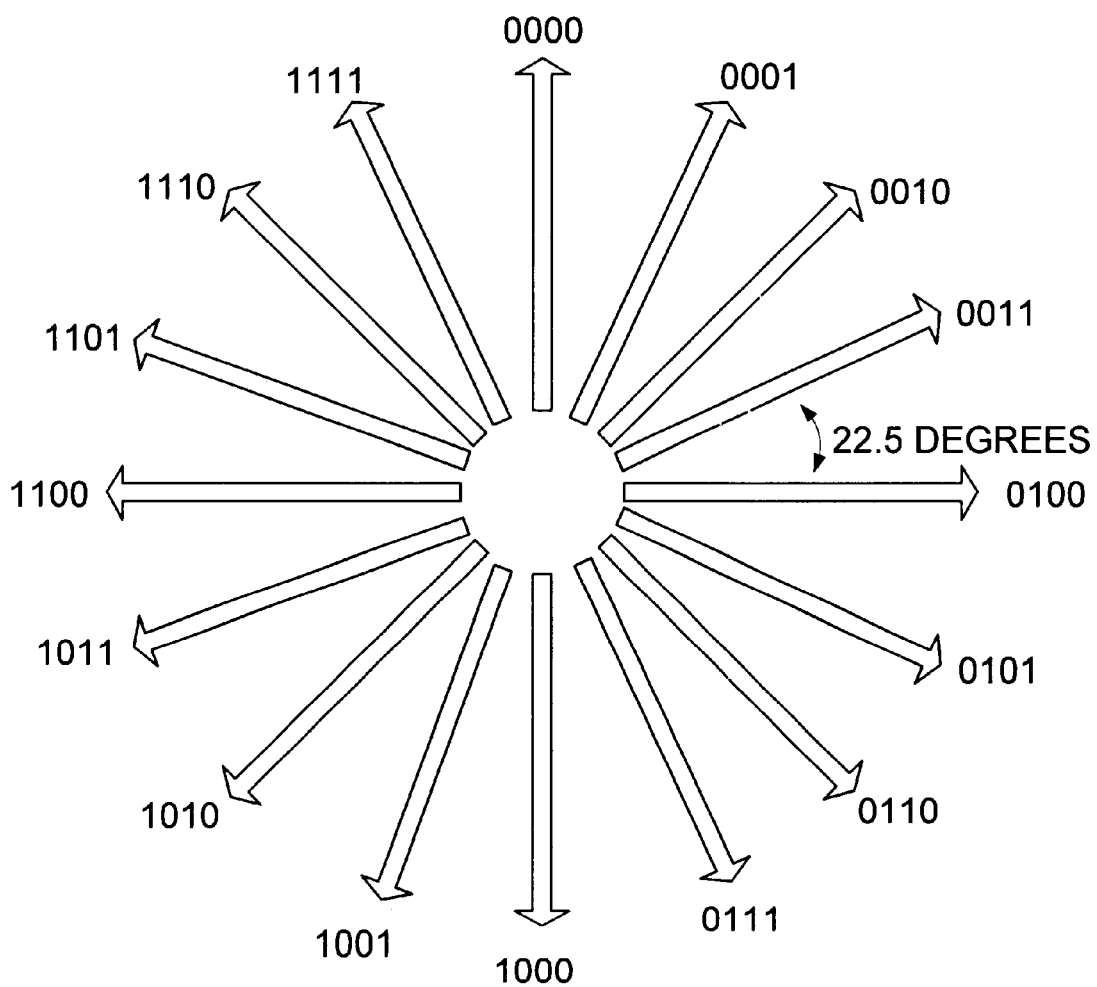
FIG. 14 is a graphical representation illustrating example pointer directions and corresponding data codes.

FIG. 14 is a graphical representation illustrating the different pointer directions and their corresponding data codes.

Shown below in Table D is an example data code for a three o'clock pointer direction at a speed of two (see Table C).

TABLE D

| MSB Bit 6 | Bit 4 | Bit 3 | Bit 2 | Bit 1 | LSB Bit 0 |
|-----------|-------|-------|-------|-------|-----------|
| 0 | 1 | 0 | 0 | 1 | 0 |

The keyboard IR program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It will be apparent to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

TABLE 1

APPENDIX A

|  |  |  |  | Key Down/Refresh | | | |
|---|---|---|---|---|---|---|---|
| key loca-tion | Key Le-gend | Key Name | State Scan | Custom Code (Hex) | Data Code (Hex) | Custom Code (Binary) | Data Code (Binary) |
| 1 | ~ ` | ~ ` | Typematic | 1E | 00 | 11110 | 000000 |
| 15 | ← BKSP Back Space | BKSP | Typematic | 1E | 01 | 11110 | 000001 |
| 61 |  | Space Bar | Typematic | 1E | 02 | 11110 | 000010 |
| 13 | + = | + = | Typematic | 1E | 03 | 11110 | 000011 |
| 53 | < , | < , | Typematic | 1E | 04 | 11110 | 000100 |
| 12 | _ - | _ - | Typematic | 1E | 05 | 11110 | 000101 |
| 54 | > . | > . | Typematic | 1E | 06 | 11110 | 000110 |
| 55 | ? / | ? / | Typematic | 1E | 07 | 11110 | 000111 |
| 11 | ) 0 $0_0$ | ) 0 | Typematic | 1E | 08 | 11110 | 001000 |
| 2 | ! $1_1$ | ! 1 | Typematic | 1E | 09 | 11110 | 001001 |
| 3 | @ $2_2$ | @ 2 | Typematic | 1E | 0A | 11110 | 001010 |
| 4 | # $3_3$ | # 3 | Typematic | 1E | 0B | 11110 | 001011 |
| 5 | $ $4_4$ | $ 4 | Typematic | 1E | 0C | 11110 | 001100 |
| 6 | % $5_5$ | % 5 | Typematic | 1E | 0D | 11110 | 001101 |
| 7 | ^ $6_6$ | ^ 6 | Typematic | 1E | 0E | 11110 | 001110 |
| 8 | & $7_7$ | & 7 | Typematic | 1E | 0F | 11110 | 001111 |
| 9 | * $8_8$ | * 8 | Typematic | 1E | 10 | 11110 | 010000 |
| 10 | ( $9_9$ | ( 9 | Typematic | 1E | 11 | 11110 | 010001 |
| 40 | : ; | : ; | Typematic | 1E | 12 | 11110 | 010010 |
| 43 | Enter ↵ | Enter | Typematic | 1E | 13 | 11110 | 010011 |
| 16 |  | TAB | Typematic | 1E | 14 | 11110 | 010100 |
| 41 | " ' | " ' | Typematic | 1E | 15 | 11110 | 010101 |
| 31 | A | A | Typematic | 1E | 16 | 11110 | 010110 |
| 50 | B | B | Typematic | 1E | 17 | 11110 | 010111 |
| 48 | C | C | Typematic | 1E | 18 | 11110 | 011000 |
| 33 | D | D | Typematic | 1E | 19 | 11110 | 011001 |
| 19 | E | E | Typematic | 1E | 1A | 11110 | 011010 |
| 79 | ← L Arrow | L | Typematic | 1E | 1B | 11110 | 011011 |
| 34 | F | F | Typematic | 1E | 1C | 11110 | 011100 |
| 35 | G | G | Typematic | 1E | 1D | 11110 | 011101 |
| 36 | H | H | Typematic | 1E | 1E | 11110 | 011110 |
| 24 | I | I | Typematic | 1E | 1F | 11110 | 011111 |
| 37 | J | J | Typematic | 1E | 20 | 11110 | 100000 |
| 38 | K | K | Typematic | 1E | 21 | 11110 | 100001 |
| 39 | L | L | Typematic | 1E | 22 | 11110 | 100010 |
| 52 | M | M | Typematic | 1E | 23 | 11110 | 100011 |
| 51 | N | N | Typematic | 1E | 24 | 11110 | 100100 |
| 25 | O | O | Typematic | 1E | 25 | 11110 | 100101 |
| 26 | P | P | Typematic | 1E | 26 | 11110 | 100110 |
| 17 | Q | Q | Typematic | 1E | 27 | 11110 | 100111 |
| 20 | R | R | Typematic | 1E | 28 | 11110 | 101000 |
| 32 | S | S | Typematic | 1E | 29 | 11110 | 101001 |
| 21 | T | T | Typematic | 1E | 2A | 11110 | 101010 |
| 23 | U | U | Typematic | 1E | 2B | 11110 | 101011 |
| 49 | V | V | Typematic | 1E | 2C | 11110 | 101100 |
| 18 | W | W | Typematic | 1E | 2D | 11110 | 101101 |
| 47 | X | X | Typematic | 1E | 2E | 11110 | 101110 |
| 22 | Y | Y | Typematic | 1E | 2F | 11110 | 101111 |
| 46 | Z | Z | Typematic | 1E | 30 | 11110 | 110000 |
| 27 | { [ | { [ | Typematic | 1E | 31 | 11110 | 110001 |
| 29[1.] | \| \ | \| \ | Typematic | 1E | 32 | 11110 | 110010 |
| 28 | } ] | } ] | Typematic | 1E | 33 | 11110 | 110011 |
| 42 |  |  | Typematic | 1E | 34 | 11110 | 110100 |
| 76 | Del | Delete | Typematic | 1E | 35 | 11110 | 110101 |
| 83 | ↑ | Up Arrow | Typematic | 1E | 36 | 11110 | 110110 |
| 84 | ↓ | Dn Arrow | Typematic | 1E | 37 | 11110 | 110111 |
| 89 | → | R Arrow | Typematic | 1E | 38 | 11110 | 111000 |
| 85 | PgUp | Page Up | Typematic | 1C | 0C | 001100 | 001100 |
| 86 | PgDn | Page Down | Typematic | 1C | 0D | 001101 | 001101 |

TABLE 2

|  |  |  | Key Down/Refresh | | | | Key Up | | | |
|---|---|---|---|---|---|---|---|---|---|---|
| Key Legend | Key Name | State Scan | Custom Code (Hex) | Data Code (Hex) | Custom Code (Binary) | Data Code (Binary) | Custom Code (Hex) | Data Code (Hex) | Custom Code (Binary) | Data Code (Binary) |
| 45[2.] |  |  | Typematic | 1E | 39 | 111001 | 111001 | 1F | 39 | 11111 | 111001 |
| 56[3.] |  |  | Typematic | 1E | 3A | 111010 | 111010 | 1F | 3A | 11111 | 111010 |
| 30 | Caps Lock | Caps Lock | Make/Break | 1E | 3B | 111011 | 111011 | 1F | 3B | 11111 | 111011 |
| 44 | ⇧ Shift | L SHIFT | Make/Break | 1E | 3C | 111100 | 111100 | 1F | 3C | 11111 | 111100 |
| 191 |  | Left Mouse | Make/Break | 1E | 3D | 111101 | 111101 | 1F | 3D | 11111 | 111101 |
| 192 |  | Right Mouse | Make/Break | 1E | 3E | 111110 | 111110 | 1F | 3E | 11111 | 111110 |
| N/A |  | Middle Mouse | Make/Break | 1E | 3F | 111111 | 111111 | 1F | 3F | 11111 | 111111 |

TABLE 2-continued

|  | Key Legend | Key Name | State Scan | Key Down/Refresh | | | | Key Up | | | |
|---|---|---|---|---|---|---|---|---|---|---|---|
|  |  |  |  | Custom Code (Hex) | Data Code (Hex) | Custom Code (Binary) | Data Code (Binary) | Custom Code (Hex) | Data Code (Hex) | Custom Code (Binary) | Data Code (Binary) |
| 57 | ⇧ Shift | R SHIFT | Make/Break | 1C | 00 | 000000 | 000000 | 1F | 00 | 11111 | 000000 |
| 58 | Ctrl | L CTRL | Make/Break | 1C | 01 | 000001 | 000001 | 1F | 01 | 11111 | 000001 |
| 60 | Alt | L ALT | Make/Break | 1C | 02 | 000010 | 000010 | 1F | 02 | 11111 | 000010 |
| 161 | App 1 | App 1 | Make/Break | 1C | 03 | 000011 | 000011 | 1F | 03 | 11111 | 000011 |
| N/A |  | Right Windows | Make/Break | 1C | 04 | 000100 | 000100 | 1F | 04 | 11111 | 000100 |
| 163 | App 2 | App 2 | Make/Break | 1C | 05 | 000101 | 000101 | 1F | 05 | 11111 | 000101 |
| 110 | Esc | Esc | Typematic | 1C | 06 | 000110 | 000110 | 1F | 06 | 11111 | 000110 |
| N//A |  | R ALT | Make/Break | 1C | 07 | 000111 | 000111 | 1F | 07 | 11111 | 000111 |
| N/A |  | R CTRL | Make/Break | 1C | 08 | 001000 | 001000 | 1F | 08 | 11111 | 001000 |
| 75 | Ins | Insert | Typematic | 1C | 09 | 001001 | 001001 | 1F | 09 | 11111 | 001001 |
| 80 | Home Next Day[4.] | Home | Typematic | 1C | 0A | 001010 | 001010 | 1F | 0A | 11111 | 001010 |
| 81 | End Prev. Day[4.] | End | Typematic | 1C | 0B | 001011 | 001011 | 1F | 0B | 11111 | 001011 |
| 90 | Num Lock | Num Lock | Typematic | 1C | 0E | 001110 | 001110 | 1F | 0E | 11111 | 001110 |
| N/A |  | Numeric* | Typematic | 1C | 0F | 001111 | 001111 | 1F | 0F | 11111 | 001111 |
| N/A |  | Numeric+ | Typematic | 1C | 10 | 010000 | 010000 | 1F | 10 | 11111 | 010000 |
| N/A |  | Numeric− | Typematic | 1C | 11 | 010001 | 010001 | 1F | 11 | 11111 | 010001 |
| N/A |  | Numeric. | Typematic | 1C | 12 | 010010 | 010010 | 1F | 12 | 11111 | 010010 |
| N/A |  | Numeric/ | Typematic | 1C | 13 | 010011 | 010011 | 1F | 13 | 11111 | 010011 |
| N/A |  | Numeric0 | Typematic | 1C | 14 | 010100 | 010100 | 1F | 14 | 11111 | 010100 |
| N/A |  | Numeric1 | Typematic | 1C | 15 | 010101 | 010101 | IF | 15 | 11111 | 010101 |
| N/A |  | Numeric2 | Typematic | 1C | 16 | 010110 | 010110 | 1F | 16 | 11111 | 010110 |
| N/A |  | Numeric3 | Typematic | 1C | 17 | 010111 | 010111 | 1F | 17 | 11111 | 010111 |
| N/A |  | Numeric4 | Typematic | 1C | 18 | 011000 | 011000 | 1F | 18 | 11111 | 011000 |
| N/A |  | Numeric5 | Typematic | 1C | 19 | 011001 | 011001 | 1F | 19 | 11111 | 011001 |
| N/A |  | Numeric6 | Typematic | 1C | 1A | 011010 | 011010 | 1F | 1A | 11111 | 011010 |
| N/A |  | Numeric7 | Typematic | 1C | 1C | 011100 | 011100 | 1F | 1C | 11111 | 011100 |
| N/A |  | Numeric8 | Typematic | 1C | 1D | 011101 | 011101 | 1F | 1D | 11111 | 011101 |
| N/A |  | Numeric9 | Typematic | 1C | 1E | 011110 | 011110 | 1F | 1E | 11111 | 011110 |
| N/A |  | Numeric Enter | Typematic | 1C | 1F | 011111 | 011111 | 1F | 1F | 11111 | 011111 |
| 112 | F1 | F1 | Typematic | 1C | 20 | 100000 | 100000 | 1F | 20 | 11111 | 100000 |
| 113 | F2 | F2 | Typematic | 1C | 21 | 100001 | 100001 | 1F | 21 | 11111 | 100001 |
| 114 | F3 | F3 | Typematic | 1C | 22 | 100010 | 100010 | 1F | 22 | 11111 | 100010 |
| 115 | F4 | F4 | Typematic | 1C | 23 | 100011 | 100011 | 1F | 23 | 11111 | 100011 |
| 116 | F5 | F5 | Typematic | 1C | 24 | 100100 | 100100 | 1F | 24 | 11111 | 100100 |
| 117 | F6 | F6 | Typematic | 1C | 25 | 100101 | 100101 | 1F | 25 | 11111 | 100101 |
| 118 | F7 ◂◂ | F7 | Typematic | 1C | 26 | 100110 | 100110 | 1F | 26 | 11111 | 100110 |
| 119 | F8 ▶ | F8 | Typematic | 1C | 27 | 100111 | 100111 | 1F | 27 | 11111 | 100111 |
| 120 | F9 ▶▶ | F9 | Typematic | 1C | 28 | 101000 | 101000 | 1F | 28 | 11111 | 101000 |
| 121 | F10 ‖ | F10 | Typematic | 1C | 29 | 101001 | 101001 | 1F | 29 | 11111 | 101001 |
| 122 | F11 ■ | F11 | Typematic | 1C | 2A | 101010 | 101010 | 1F | 2A | 11111 | 101010 |
| 123 | F12 REC | F12 | Typematic | 1C | 2B | 101011 | 101011 | 1F | 2B | 11111 | 101011 |
| 124 | PrtSc SysRq | Print Screen | Typematic | 1C | 2C | 101100 | 101100 | 1F | 2C | 11111 | 101100 |
| 125 | Scroll Lock | Scroll Lock | Typematic | 1C | 2D | 101101 | 101101 | 1F | 2D | 11111 | 101101 |
| 126 | Pause Break | Pause | Make only | 1C | 2E | 101110 | 101110 |  |  |  |  |
| 107[3.] |  |  | Typematic | 1C | 2F | 101111 | 101111 | 1F | 2F | 11111 | 101111 |

Direct Access Remote Control Keys and keycodes.

| key location | Key Legend | Key Name | Custom Code (Hex) | Data Code (Hex) | Custom Code (Binary) | Data (Binary) |
|---|---|---|---|---|---|---|
| 184 | CBL POWER | Cable Power | 1B | 07 | 11011 | 000111 |
| 171[2] | TV POWER | TV Power | N/A | | | |
| 172 | SETTINGS | Settings[4] | 1B | 39 | 11011 | 111001 |
| 172 | MENU | Menu[4] | 1B | 0A | 11011 | 001010 |
| 173 | GUIDE | GUIDE | 1B | 06 | 11011 | 000110 |
| 174 | INFO | INFO | 1B | 08 | 11011 | 001000 |
| 176[1] | Ⓐ | A | 1B | 2F | 11011 | 101111 |
| 177[1] | Ⓑ | B | 1B | 30 | 11011 | 110000 |
| 178[1] | Ⓒ | C | 1B | 31 | 11011 | 110001 |
| 180 | SELECT | SELECT | 1B | 0C | 11011 | 001100 |
| 181[1] | EXIT | Exit | 1B | 2C | 11011 | 101100 |
| 182[1] | BYPASS | Bypass | 1B | 0D | 11011 | 001101 |
| 183 | FAV | Favorite | 1B | 1F | 11011 | 011111 |
| 185 | LAST | LAST | 1B | 0E | 11011 | 001110 |
| 189 | CH+ | CH+ (up) | 1B | 1D | 11011 | 011101 |
| 190 | CH− | CH− (down) | 1B | 1E | 11011 | 011110 |
| 188[2] | VOL+ | TV/DHCT Vol+ | 1B | 20 | 11011 | 100000 |
| 187[2] | VOL− | TV/DHCT Vol− | 1B | 21 | 11011 | 100001 |
| 186[2] | MUTE | TV/DHCT Mute | 1B | 22 | 11011 | 100010 |
| 2[3] | ! $1_1$ | 1 Key, Remote Control | 1B | 10 | 11011 | 010000 |
| 3[3] | @ $2_2$ | 2 Key, Remote Control | 1B | 11 | 11011 | 010001 |
| 4[3] | # $3_3$ | 3 Key, Remote Control | 1B | 12 | 11011 | 010010 |
| 5[3] | $ $4_4$ | 4 Key, Remote Control | 1B | 13 | 11011 | 010011 |
| 6[3] | % $5_5$ | 5 Key, Remote Control | 1B | 14 | 11011 | 010100 |
| 7[3] | ^ $6_6$ | 6 Key, Remote Control | 1B | 15 | 11011 | 010101 |
| 8[3] | & $7_7$ | 7 Key, Remote Control | 1B | 16 | 11011 | 010110 |
| 9[3] | * $8_8$ | 8 Key, Remote Control | 1B | 17 | 11011 | 010111 |
| 10[3] | ( $9_9$ | 9 Key, Remote Control | 1B | 18 | 11011 | 011000 |
| 11[3] | ) $0_0$ | 0 Key, Remote Control | 1B | 19 | 11011 | 011001 |
| 118[3] | F7 ◀◀ | Rew | 1B | 29 | 11011 | 101001 |
| 119[3] | F8 ▶ | Play | 1B | 33 | 11011 | 110011 |
| 120[3] | F9 ▶▶ | FF | 1B | 28 | 11011 | 101000 |
| 121[3] | F10 ‖ | PAUSE | 1B | 05 | 11011 | 000101 |
| 122[3] | F11 ■ | Stop | 1B | 34 | 11011 | 110100 |
| 123[3] | F12 REC | Rec | 1B | 35 | 11011 | 110101 |

What is claimed is:

1. An infrared (IR) keyboard having a communications protocol, said protocol comprising:
   means for converting a standard recognized keystroke into a corresponding IR data word;
   means for prioritizing said IR data word; and
   means for transmitting said IR data word.

2. The keyboard of claim 1, wherein said standard recognized keystroke is chosen from within a group, wherein the group is a set of Table One typematic keys, a set of Table Two typematic keys, a set of Table Two make/break keys or a set of Table Two make only keys.

3. The keyboard of claim 1, wherein a plurality of said corresponding IR data words are separated by at least a 37 millisecond (ms) delay.

4. The keyboard of claim 1, wherein a plurality of said corresponding IR data words are separated by at least a 43 millisecond (ms) delay.

5. The keyboard of claim 1, wherein said data word is repeated every 425 ms.

6. The keyboard of claim 1, wherein said keystroke is a key press event.

7. The keyboard of claim 1, wherein said keystroke is a key release event.

8. The keyboard of claim 4, wherein a priority IR data word is transmitted after said 43 ms delay following one of said plurality of said corresponding IR data words.

9. The keyboard of claim 1, further comprising a pointing device.

10. A method for operating an infrared (IR) keyboard, the method comprising the steps of:
    detecting, in a keyboard, a standard recognized keystroke;
    converting said standard recognized keystroke into a corresponding IR data word;
    prioritizing said IR data word; and
    transmitting said IR data word based on its priority.

11. The method of claim 10, wherein said standard recognized keystroke is chosen from within a group, wherein the group is a set of Table One typematic keys, a set of Table Two typematic keys, a set of Table Two make/break keys or a set of Table Two make only keys.

12. The method of claim 10, further comprising the step of assigning a communication protocol to said IR data word.

13. The method of claim 10, wherein a plurality of said corresponding IR data words are separated by at least a 37 millisecond (ms) delay.

14. The method of claim 10, wherein a plurality of said corresponding IR data words are separated by at least a 43 millisecond (ms) delay.

15. The method of claim 10, further comprising the step of repeating said data word every 425 ms.

16. The method of claim 10, wherein said keystroke is a key press event.

17. The method of claim 10, wherein said keystroke is a key release event.

18. The method of claim 14, wherein a priority IR data word is transmitted after said 43 ms delay following one of said plurality of said corresponding IR data words.

19. An infrared (IR) keyboard comprising:
   circuitry configured to convert a standard recognized keystroke into a corresponding IR data word;
   circuitry configured to prioritize said IR data word; and
   circuitry configured to transmit said IR data word.

20. The keyboard of claim 19, wherein said standard recognized keystroke is chosen from within a group, wherein the group is a set of Table One typematic keys, a set of Table Two typematic keys, a set of Table Two make/break keys or a set of Table Two make only keys.

21. The keyboard of claim 19, wherein a plurality of said corresponding IR data words are separated by at least a 37 millisecond (ms) delay.

22. The keyboard of claim 19, wherein a plurality of said corresponding IR data words are separated by at least a 43 millisecond (ms) delay.

23. The keyboard of claim 19, wherein said data word is repeated every 425 ms.

24. The keyboard of claim 19, wherein said keystroke is a key press event.

25. The keyboard of claim 19, wherein said keystroke is a key release event.

26. The keyboard of claim 22, wherein a priority IR data word is transmitted after said 43 ms delay following one of said plurality of said corresponding IR data words.

27. The keyboard of claim 19, further comprising a pointing device.

28. A computer readable medium having a program for operating an infrared (IR) keyboard, the program comprising logic configured to perform the steps of:
   detecting, in a keyboard, a standard recognized keystroke;
   converting said standard recognized keystroke into a corresponding IR data word;
   prioritizing said IR data word; and
   transmitting said IR data word based on its priority.

29. The program of claim 28, wherein said standard recognized keystroke is chosen from within a group, wherein the group is a set of Table One typematic keys, a set of Table Two typematic keys, a set of Table Two make/break keys or a set of Table Two make only keys.

30. The program of claim 28, further comprising logic configured to perform the step of assigning a communication protocol to said IR data word.

31. The program of claim 28, wherein a plurality of said corresponding IR data words are separated by at least a 37 millisecond (ms) delay.

32. The program of claim 28, wherein a plurality of said corresponding IR data words are separated by at least a 43 millisecond (ms) delay.

33. The program of claim 28, further comprising the step of repeating said data word every 425 ms.

34. The program of claim 28, wherein said keystroke is a key press event.

35. The program of claim 28, wherein said keystroke is a key release event.

36. The program of claim 32, wherein a priority IR data word is transmitted after said 43 ms delay following one of said plurality of said corresponding IR data words.

* * * * *

UNITED STATES PATENT AND TRADEMARK OFFICE
CERTIFICATE OF CORRECTION

PATENT NO. : 6,538,595 B1 Page 1 of 1
DATED : March 25, 2003
INVENTOR(S) : Tucker et al.

It is certified that error appears in the above-identified patent and that said Letters Patent is hereby corrected as shown below:

Column 7,
Line 37, insert -- key combinations -- between "three" and "mentioned".
Line 55, at the bottom of the 3rd column under Table B, insert -- \ -- below "]".

Column 11,
Line 18, under Table 1, Appendix A, under columns "Key Legend" and "Key Name", delete ">," in both columns and insert therefore -- >. -- in both columns.

Column 15,
Under Table entitled "Direct Access Remote Control Keys and keycodes," delete "Key Lengend" at the top of the second column, and insert therefore -- Key Legend --.
Under Table entitled "Direct Access Remote Control Keys and keycodes," under column "key location" under "118³." and column "Key Legend" under "F7", delete "◄◄" and insert therefore -- ◄◄ 5. --
Under Table entitled "Direct Access Remote Control Keys and keycodes," under column "key location" under "119³." and column "Key Legend" under "F8", delete "►" and insert therefore -- ► 5. --
Under Table entitled "Direct Access Remote Control Keys and keycodes," under column "key location" under "120³." and column "Key Legend" under "F9", delete "►►" and insert therefore -- ►► 5. --
Under Table entitled "Direct Access Remote Control Keys and keycodes," under column "key location" under "121³." and column "Key Legend" under "F10", delete "ll" and insert therefore -- ll 5. --

Signed and Sealed this

Thirteenth Day of January, 2004

JON W. DUDAS
*Acting Director of the United States Patent and Trademark Office*